No. 645,577. Patented Mar. 20, 1900.
J. R. THOMAS & H. S. SPENCER.
PLANING MACHINE.
(Application filed Apr. 24, 1899.)
(No Model.) 7 Sheets—Sheet 3.
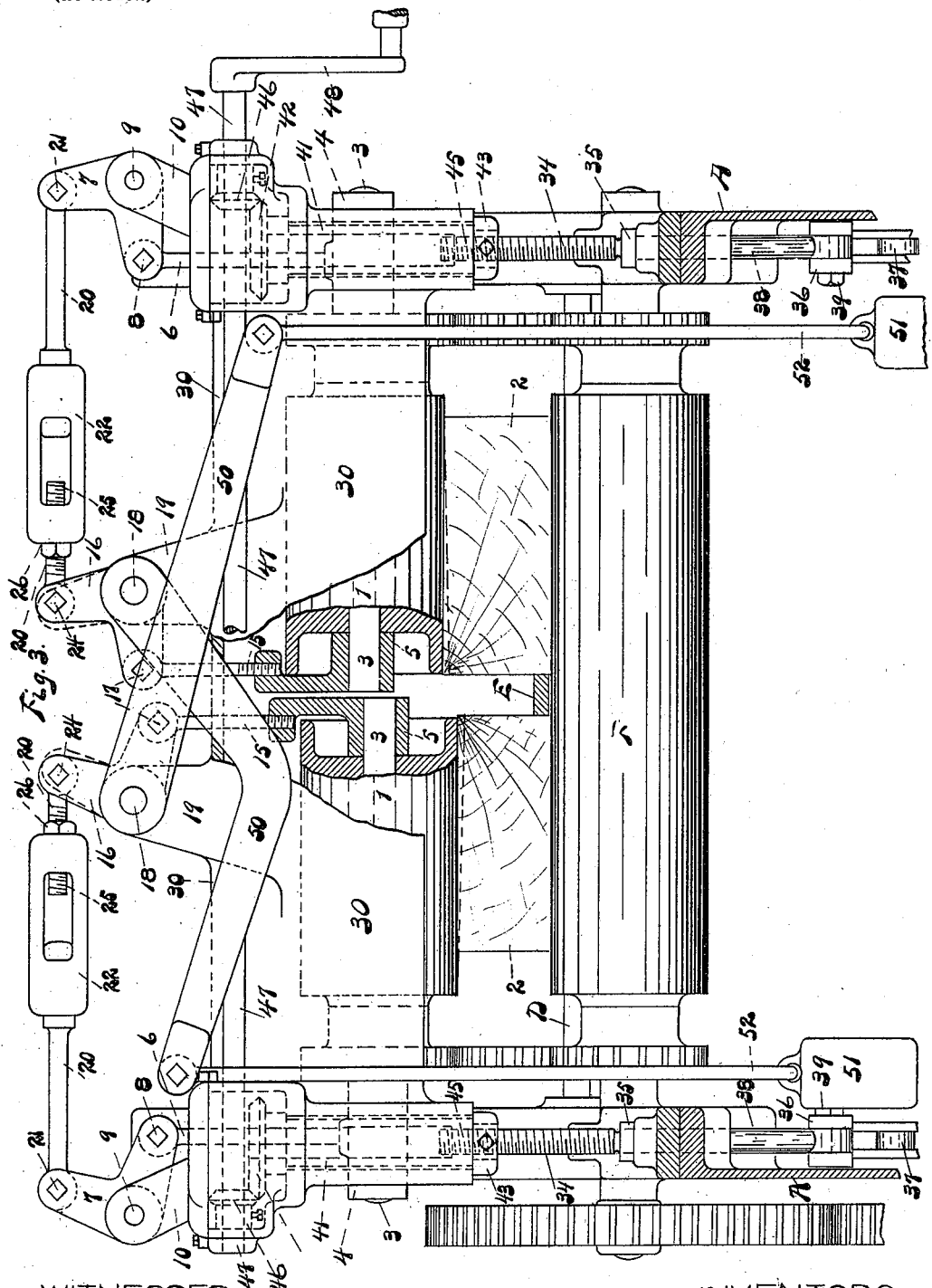
WITNESSES. INVENTORS.

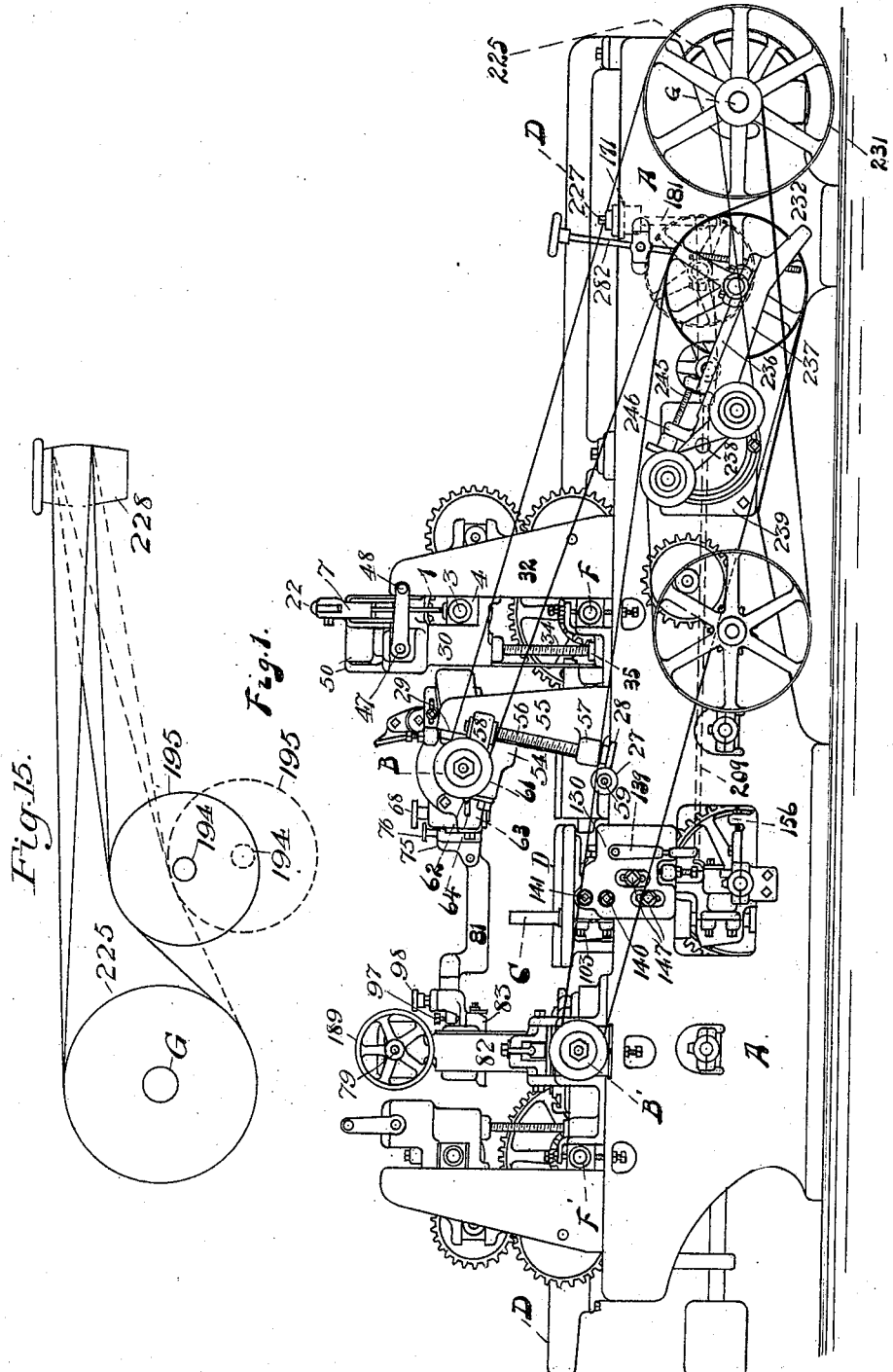

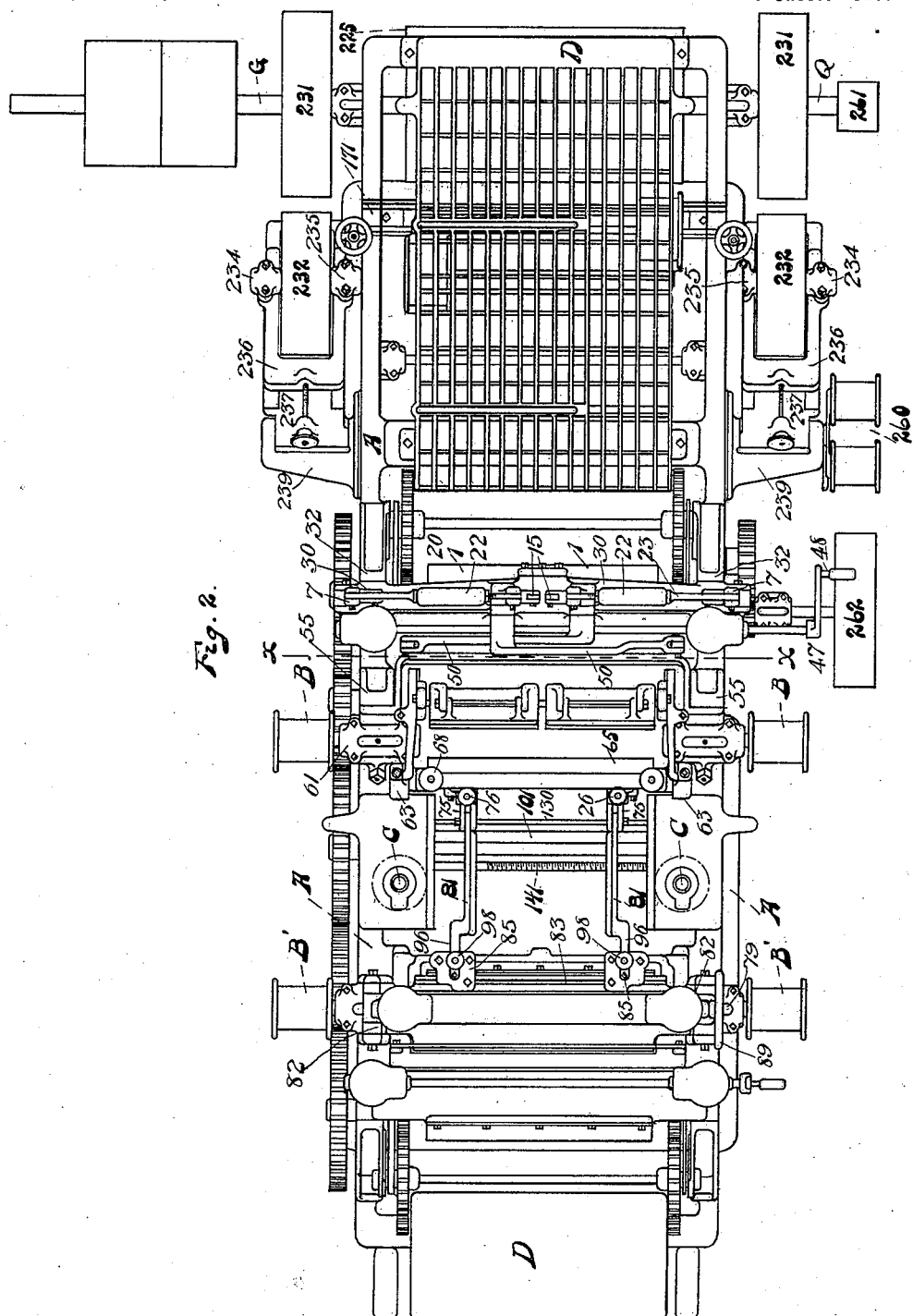

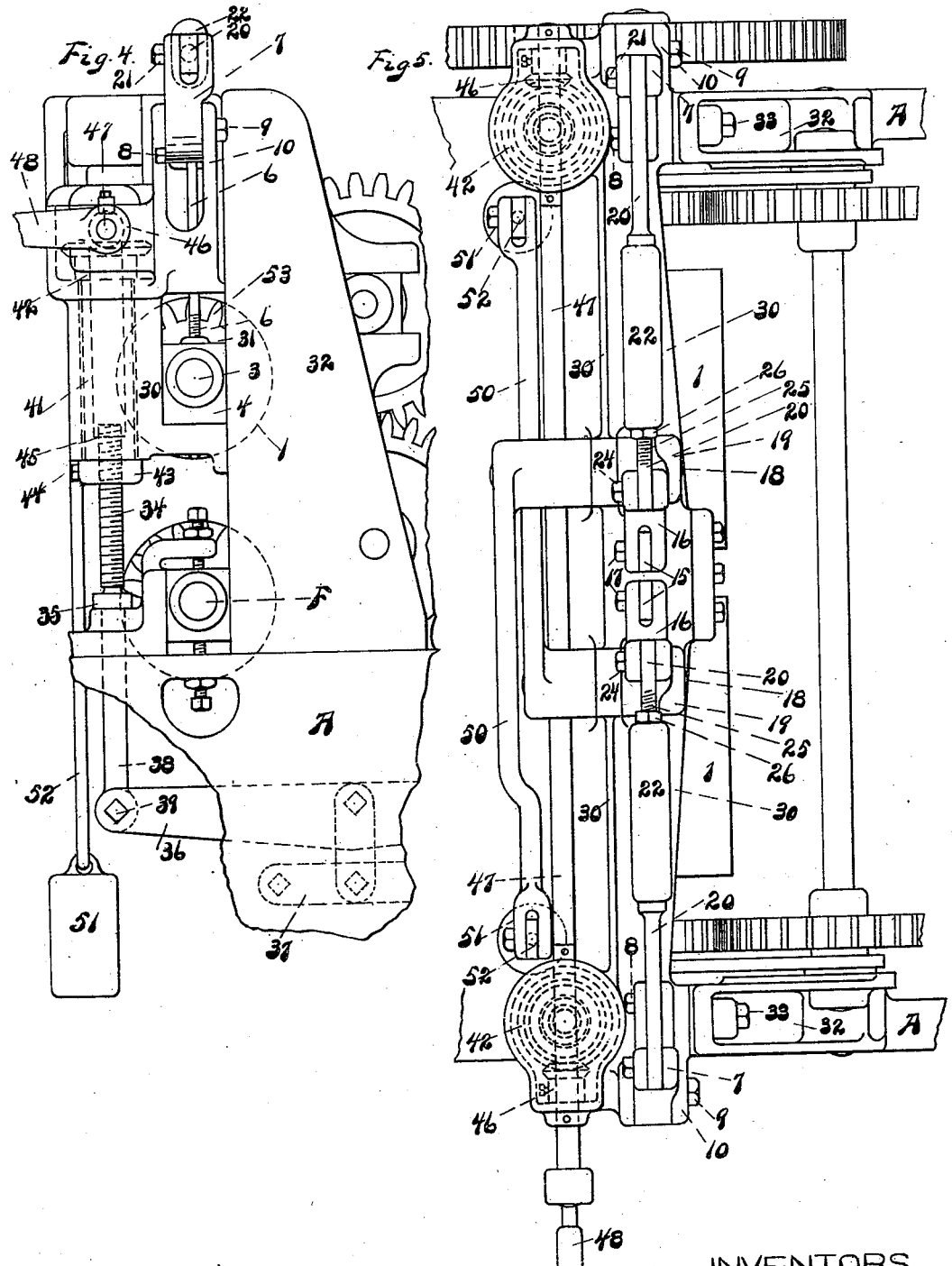

No. 645,577. Patented Mar. 20, 1900.
J. R. THOMAS & H. S. SPENCER.
PLANING MACHINE.
(Application filed Apr. 24, 1899.)
(No Model.) 7 Sheets—Sheet 5.
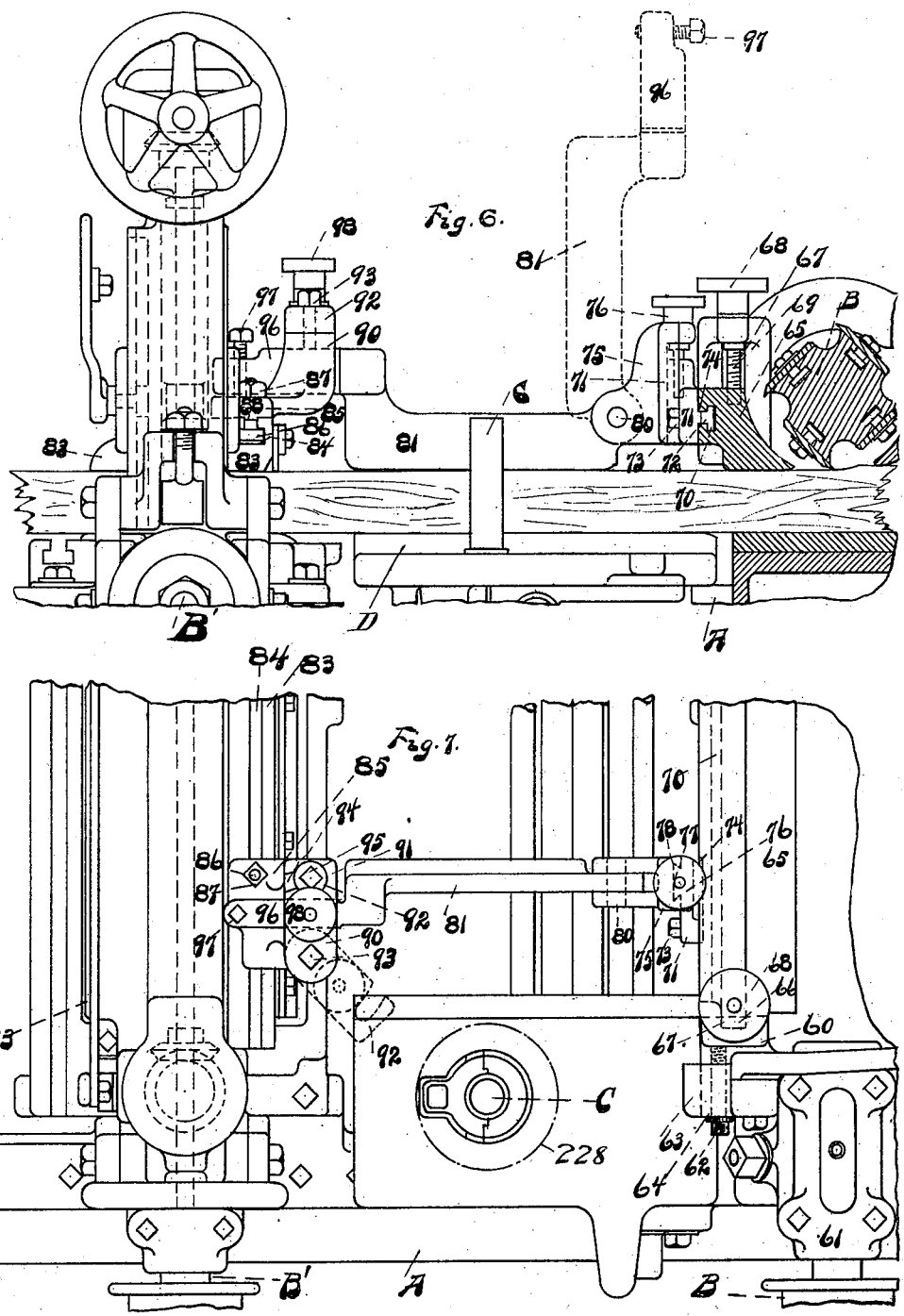
WITNESSES.
Parke S. Johnson
Emil Rapp
INVENTORS.
John Rickard Thomas,
Harry Smith Spencer,
by J. F. Herbolet, Their Attorney.

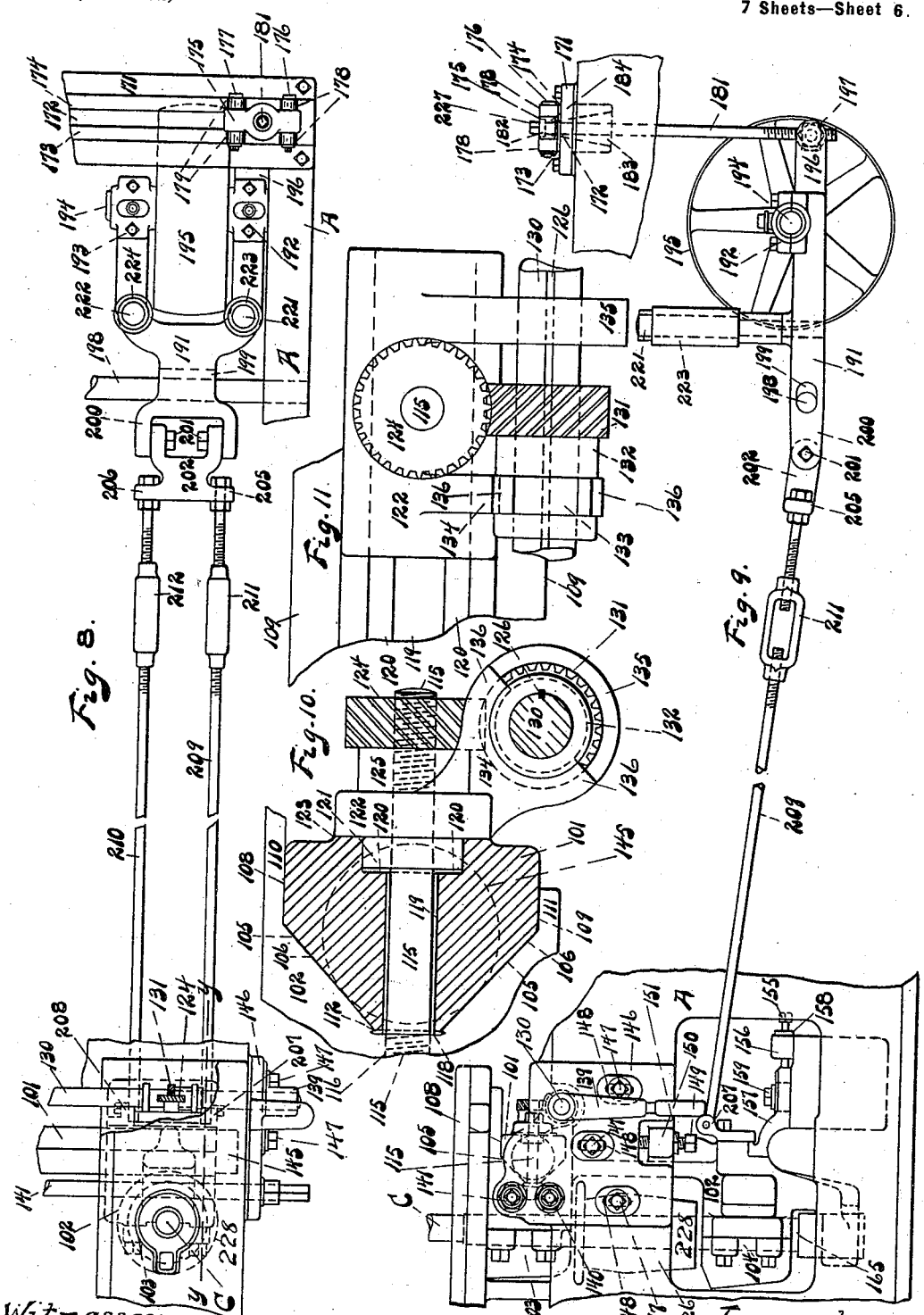

No. 645,577. Patented Mar. 20, 1900.
J. R. THOMAS & H. S. SPENCER.
PLANING MACHINE.
(Application filed Apr. 24, 1899.)
(No Model.) 7 Sheets—Sheet 7.
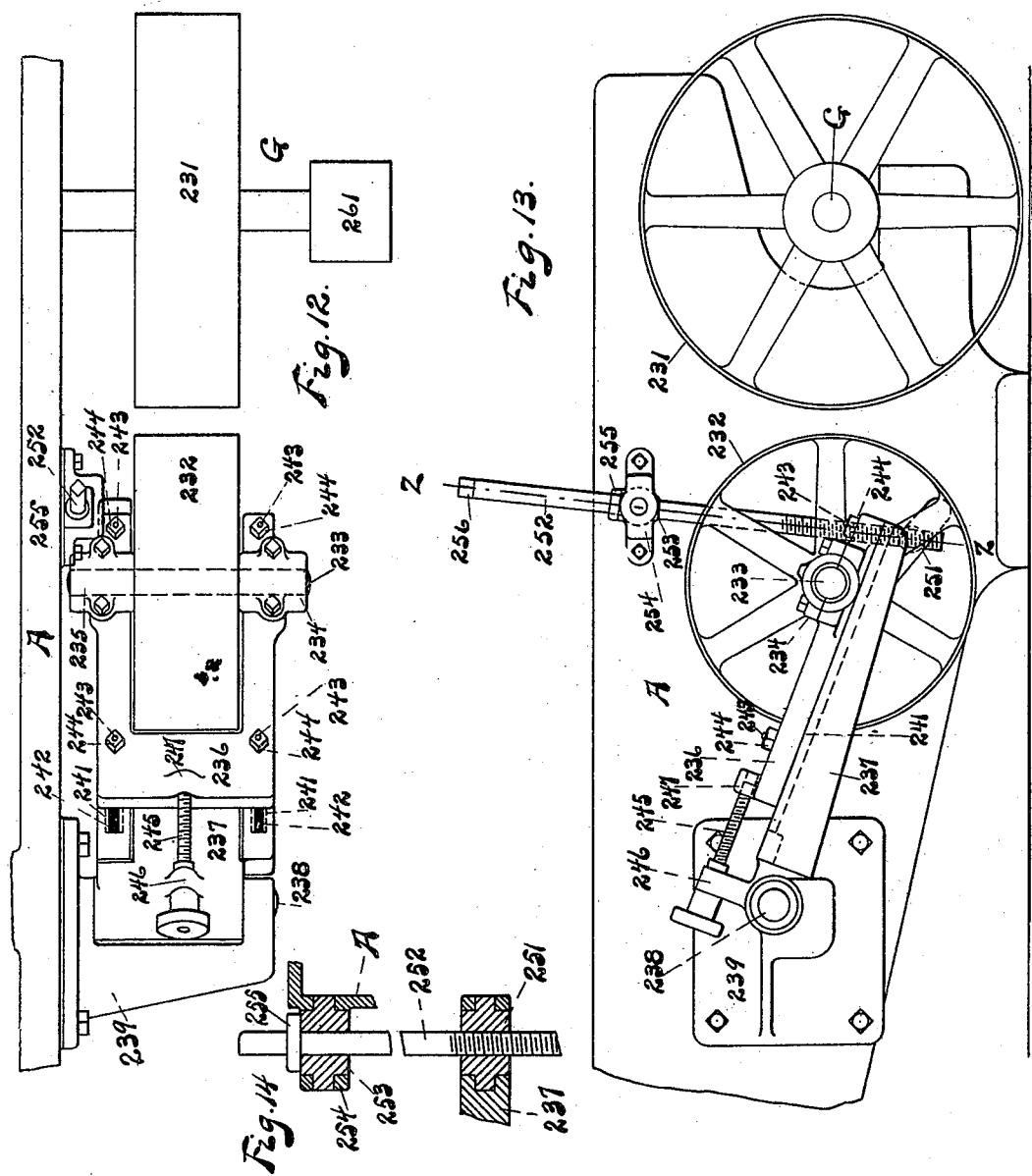

UNITED STATES PATENT OFFICE.

JOHN RICKARD THOMAS, OF CINCINNATI, AND HARRY SMITH SPENCER, OF BOND HILL, OHIO, ASSIGNORS TO THE J. A. FAY & EGAN COMPANY, OF CINCINNATI, OHIO.

PLANING-MACHINE.

SPECIFICATION forming part of Letters Patent No. 645,577, dated March 20, 1900.

Application filed April 24, 1899. Serial No. 714,273. (No model.)

*To all whom it may concern:*

Be it known that we, JOHN RICKARD THOMAS, residing at Cincinnati, and HARRY SMITH SPENCER, residing at Bond Hill, in the county of Hamilton and State of Ohio, citizens of the United States, have invented a certain new and useful Improvement in Planing-Machines, of which the following is a specification.

Our invention relates to planing-machines, and has for its object the providing of agencies for the side cutter-spindles to hold the stock in a true line with the line of cut of the latter cutters and to coactively connect the cutting agencies and with improved methods for insuring smoothness of work.

Our invention consists, further, in providing a hinged pressure bar (or bars) which preferably connects the upper cylinder of the machine with the pressure-plate above the lower cylinder and intermediately connects the various cutting agencies and takes between the vertical or side spindles and exerts a force upon the stock passing through the machine to hold it firmly in a straight line between the bed and the pressure bar (or bars) and dispels the jar or vibration of the machine while being operated, giving to the machine substantiality and producing a construction in which the cutting agencies, and the parts against which the cutting agencies exert their jar or vibrating force are coactively connected, each part serving to steady the other.

Our invention consists, further, in providing a peculiar means for locking the vertical or side cutter-head spindles in position after adjustment, and, further, in providing novel belt-tightening arrangements to give proper tension to all of the belts leading from a suitable source of power to each of the cutter-head spindles, and, further, in the parts and in the arrangement and combinations of parts hereinafter more fully described and claimed.

In the drawings, Figure 1 is a side elevation of our improved machine. Fig. 2 is a plan view of the same. Fig. 3 is a transverse section, looking toward the feeding-in end of the machine, on the line $x\,x$, Fig. 2, illustrating the manner of constructing the feeding-rolls and connected parts. Fig. 4 is a side view, and Fig. 5 a plan view, of the same. Fig. 6 is a side view, partly in section, of one of the connecting pressure-bars between the vertical or side cutter-head spindles and connected parts. Fig. 7 is a plan view of the same. Fig. 8 is a plan view of a detail, showing the method of locking the vertical or side cutter-head spindles, and the belt-tightener arrangement for the latter. Fig. 9 is a side elevation of the same. Fig. 10 is a cross-section on the line $y\,y$, Fig. 8, of a detail of the vertical or side cutter-head-spindle-locking arrangement, and Fig. 11 a plan view of the same. Fig. 12 is a plan view of a detail showing the belt-tighteners for the main cylinders. Fig. 13 is a side elevation of the same, and Fig. 14 is a section on the line $z\,z$, Fig. 13, showing the raising-screw therefor, with its connections. Fig. 15 is a diagram of the belt for actuating the vertical cutter-spindle, illustrating the relation of the main pulley or drum, the pulley on the support, and the pulley on the vertical cutter-spindle, and showing an assumed position of the belt and the pulley on the support in dotted lines.

A represents the frame of the machine, in which are mounted, preferably, an upper cutting-cylinder B, a lower cutting-cylinder B', and vertical or side cutter-head spindles C C'.

D represents the bed or work-support of the machine, on which suitable gage or gages E may be secured at any point desirable in the breadth of the bed and secured thereto in any suitable manner. This gage or gages may extend throughout the length of the machine, guiding the material until it arrives at its feeding-out end.

Suitable feeding-rolls, as shown at F F', may be placed in the bed of the machine, adjustable vertically and in a suitable manner.

At the feeding-in end of the machine we prefer to place one or more rolls 1 1, (see Figs. 3, 4, and 5,) which we have shown divided, forming two rolls adapted to rotate side by side, but independently of each other, and each adapted to exert its feeding power independently upon each of the two pieces of stock shown at 2 2, each of which pieces of stock may be of uneven thickness, or both of relatively-different thickness, without affecting the feed exerted upon the other.

We do not in this application claim the rolls 1 1, their construction, or means for hanging or weighting the same herein shown and described; but John R. Thomas, one of the applicants herein, embodies that subject-matter in a divisional application, being Serial No. 728,716, filed August 28, 1899, more fully showing, describing, and claiming the same, he being the sole inventor of that subject-matter.

The rolls are mounted upon shafts 3 3, having their outer ends journaled in bearings 4 4 and their inner ends in bearings 5 5. Links 6 6 are secured to the outer bearings 4 4 and pivotally connect with levers 7 7 by means of suitable bolts 8 8. The levers 7 7 are secured to rock-shafts 9 9, mounted in ears 10 10 on the roll-housing hereinafter described. The inner bearings of the rolls are secured to links 15 15, connecting with levers 16 16 by means of pins 17 17. The levers are preferably in the shape of bell-cranks. The levers 16 16 may be secured to the rock-shafts 18 18, mounted in ears 19 19 on the roll-housing. The other ends of the levers 7 7 and 16 16 are preferably connected in the following manner: Tie-rods 20 20, preferably divided, are pivotally secured by means of pins 21 21 to the levers 7 7 at one end and have turn-buckles 22 22 turning thereon and connecting the divided ends of the tie-rods. The other ends of the tie-rods are connected with the levers 16 16 by means of pins 24 24. The turn-buckles are collared to one end of the divided tie-rods and screw-threaded, as at 25 25, to the other end. Jam-nuts 26 26 secure the same in position after adjustment.

A suitable roll-housing 30 is provided, which supports the above-mentioned parts. It has a recess 31 at each end, the lower end of which normally supports the outer bearings 4 4 for the rolls. The housing preferably spans the machine and may be adjusted vertically on uprights 32 32 and secured in place, if desired, by means of bolts 33 33.

Screw-shafts 34 34 are supported in the frame of the machine, preferably by means of collars 35 35, having suitable pressure-levers 36 37, secured to extensions 38 thereon by means of bolts 39. The screw-shafts 34 have an elongated nut 41 taking about the same and meshing therewith and shouldered against endwise movement relatively to the housing, preferably at one end by means of a bevel-gear 42 and at its other by a collar 43, secured thereto by a bolt 44, the thread in the nut extending preferably only a limited distance, as shown at 45. The nut makes into a bell-mouthed shell 49 on the housing. The bevel-gear 42 is secured to the screw-shaft and has meshing therewith bevel-pinions 46 46, secured to a shaft 47, having a crank 48 for turning the same. When the shaft 47 is rotated, the bevel-pinions operate the bevel-gears on the elongated nuts and raise and lower the housing 30, carrying with it the feeding-rolls and connected parts hereinbefore described. The weight exerted through weighted levers 36 37 normally holds the collars 35 on the screw-shafts 34 against the frame of the machine, and consequently normally holds the housing in its adjusted position. If it is desired to remove the elongated nut, it is only necessary to remove the shaft from its bearings, in which it is detachably secured, preferably endwise, together with its pinions, when the elongated nut lies exposed and can be unscrewed from its shaft and the shaft then also be readily removed. The housing has meanwhile been fastened to its slide by means of bolts 33.

The rock-shafts 18 are adapted to carry rigidly secured thereto pressure-levers 50 50, carrying weights 51 51, connected by suitable links 52 52, taking into a fork at the end of the levers. The pressure exerted by the weights is transmitted through the levers 16 16 to the inner ends of the rolls by means of the links 15 15 and to the outer ends of the rolls through the medium of the tie-rod and turnbuckles 20 and 22, to the outer lever 7 7 and links 6 6 to their bearings. This pressure is transmitted to the bearings of the divided rolls in such manner that the outer bearings thereof will always normally rest at the lower end of the openings 31 31 of the housing 30. When the outer bearings shall have been raised sufficiently by the stock so that they strike the upper end 53 of the recess 31, a further raising of the rolls will carry the housing with it. Adjustment of the rolls to and from a horizontal plane is effected by means of the turnbuckles 22 in the tie-rod 20.

To the rear of the upper cylinder B (see Figs. 1, 6, and 7) we have secured suitable supports 60 60, attached to extensions 63 of the bearings 61 of the cylinder B by means of bolts 62, taking through slots 64 in the extension. The bearings 61 of the cylinder are on a housing 54, extending transversely across the frame. (See Figs. 1 and 2.) The housing is adjustable on uprights 55 by means of a screw-shaft 56 on each side of the machine, journaled in a lug 57 on the frame, taking into a threaded lug 58 on the housing, thereby adjusting the cylinder to proper position with relation to the plane of the bed, in which position it may be given additional rigidity by the housing being bolted to the uprights in the ordinary and well-known way. The screw-shaft 56 on the respective sides of the machine may be interconnected by a shaft 59 and suitable gears 27 and 28. A presser-foot 65 is vertically adjustably hung in the supports by means of tongues 66, taking into grooves 67 67 in the supports, and having hand-wheels 68 68, collared to the supports preferably adjacent to the tongues, carrying adjusting screws 69 69, tapping into the presser-foot, giving to the presser-foot the required vertical adjustment with relation to the cutting-knives on the head. The presser-foot is provided with a preferably T-shaped groove 70, in which brackets 71 are slidably secured by means of headed bolts 72 72 and nuts 73 73, the adjustment of the brackets being transverse of the machine, the brackets also having suitable guiding projections 74 to slide against the outer portion of the walls of the T-shaped groove. The brackets carry suitable secondary brackets 75 75, adjustable vertically by means of adjusting-screws 76 76, collared to the secondary brackets and tapping into the primary bracket and giving to the former vertical adjustment, guided by the tongue 77, taking into the groove 78 between the two brackets. The secondary brackets have hinged thereto, on pivots 80, an apparatus which we choose to term a "connecting pressure-bar" 81 81, which preferably spans the distance between the bracket and the pressure-plate over the lower cylinder. This latter pressure-plate we denote by the numeral 83, and it is adapted to carry a T-shaped groove 84, in which a bracket 85 is slidably secured by means of headed bolts 86 and nuts 87. The brackets 85 also have suitable guiding projections 88 projecting partly into the grooves 84 to prevent angular displacement of the bracket with reference to the guide. The brackets 85 are preferably yoke-shaped, having ears 90 91, extending upwardly, connected by a plate 92, turning on a pivot 93 and having an elongated opening 94 at its other end to take about a bolt 95, adapted to secure the plate in position above the connecting pressure-bar. The connecting pressure-bar preferably has an elevated projection 96, carrying an adjusting-bolt 97, adapted to rest upon the bracket 85. The plate 92 preferably has collared thereto a set-screw 98, taking against the upper face of the connecting pressure-bar. The connecting pressure-bar also has a longitudinally-sliding connection at its end to accommodate itself to the varying distance between the cylinder and the pressure-plate when the cylinder and pressure-plate are raised and lowered with reference to the bed. This varying distance is caused by the cylinder raising and lowering on inclined ways 29 on the standards 55 in its adjustments. This longitudinally-sliding connection is given in the form shown by elongating the elevated projection 96 and the seat for the adjusting-bolt 97 on the bracket 85 that the distance between the vertical planes of the adjusting-bolt 97 and set-screw 98 may be varied, as will be seen by comparing these parts in Figs. 1 and 6. There may be one or more of these pressure-bars in the machine. We have shown two in the drawings, the inner faces of which are preferably adapted to meet in line, so that they may be placed side by side and practically form one bar. Sidewise adjustment is given to the bars by means of the brackets 71 and 85 connecting with the respective ends of the pressure-bar. Vertical adjustment with reference to the presser-plate 83 is given through the medium of set-screws 76 at that end, and at the other end this adjustment is given by means of the set-bolt 97 and held in rigid position by the set-screw 98 in the plate 92. The presser-foot and the pressure-plate over the lower cylinder can be independently adjusted vertically and rigidly held in adjusted position in any ordinary and suitable way. The vertical adjustment for the pressure-plate 83 is effected by means of an adjusting-shaft 79 and hand-wheel 89, which adjust the pressure-plate up and down to and from the bed of the machine on standards 82, mounted on the frame. The brackets 71 and 85 may of course be secured to suitable other parts of the machine; but we have preferred to connect them in the manner set forth, so as to bring the cutting agencies and connecting parts of the machine in continuous connection with each other, to prevent vibration and jarring and to form a machine substantial in character and adapted to do smoother work. The connecting pressure-bars hold the stock against the table of the machine, taking out the wind or bend of the same at that point and bringing the upper and lower surfaces of the stock continuously into a fixed and determined relation to the cutting agencies on the vertical or side spindles, causing the cut made by those cutting agencies to be in continued similar relation to the respective upper and lower faces of the boards, so that when their matched edges are brought together the meeting contours, or preferably tongues and grooves, may be in such relation to each other that the wind may be taken out of the stock when connected and the respective upper and lower surfaces of all the boards may correspond to the edge contours in like manner throughout, so that the edge contours may cause the respective upper and lower surfaces to meet no matter in what part of the length thereof connection may be desired to be made.

The side spindles C C' (see Figs. 8, 9, 10, and 11) may be adjusted transversely of the machine on a guiding-bar 101, the matcher-spindles being mounted in hangers 102, which we have shown yoke-shaped, carrying bearings 103 104 for the spindles. The matcher-hangers carry suitable ways 105 of a shape to correspond to the guiding-faces 106 106 of the guiding-bar. These guiding-faces are preferably angled to each other at or nearly at right angles, having parallel extensions 108 109 at their ends, the lips 110 111 on the matcher-hangers taking against the parallel faces and guided thereby. The apex of the angle of the guiding-faces 106 106 is preferably removed and a space 112 provided between the guiding-bar and matcher-hangers. A bolt or threaded rod 115 is preferably tapped into the matcher-hangers, as at 116, against a shoulder 118 on the bolt. The bolt takes through and slides in a slot 119 in the guiding-bar, which is also provided with depressions 120 120 on either side of the groove to accommodate a tongue 121 on a saddle 122, shouldered on the guiding-bar, as at 123, and taking about the shank of the bolt 115. A gear 124, which may have a hub 125, also takes about the bolt and is preferably internally tapped to take about the outer threaded end of the bolt 115. Turning this gear so as to follow the thread on the bolt inwardly will force the saddle inwardly against the guiding-bar and force the matcher-hanger toward the guiding-bar on its inclined faces. We provide a shaft 130, preferably extending transversely of the machine. This shaft is splined, as at 126, to suitable gears 131, having an extended hub 132, provided with an annular groove 133. A suitable fork 134 and ring 135 project from the saddle 122, the tines 136 of the former of which take into the annular groove 133 and carry the gear 131 with them in the transverse movement of the matcher-hanger. The ring 135 takes about the shaft proper, steadying it and insuring the meshing of the threads on the gears 124 131. A lever 139 may be secured to one end of the shaft for the purpose of rotating the same. Screw-shafts 140 and 141 are tapped one into each hanger, respectively, and serve to adjust the spindles transversely of the machine. The guiding-bar is hung at both ends of the machine on suitable trunnions 145, extending into plates 146, which may extend into the frame beyond its side, preferably secured to the frame of the machine by means of bolts 147, taking through slots 148 in the plate and into the frame. The plate at a suitable point rests upon the end of a set-bolt 149, tapped into a lug 150 in the frame and secured in position by means of a jam-nut 151, the set-bolt giving the plate its vertical adjustment and the bolts 147 serving to fix it in place.

The matcher-housings are given an adjustment into and away from a vertical plane by means of a set-bolt 155, taking into a tapped lug 156 in the frame of the machine and against a foot 157 on the matcher-housing and secured in place by means of a jam-nut 158. Another set-bolt 159 takes through a slot in the foot 157 and taps into the frame of the machine, securing the matcher-housing in position after adjustment. The lower part of the vertical spindles may be stepped into suitable boxes 165.

A transverse bar 171 (see Figs. 1, 2, 8, and 9) is secured in a suitable position at the feeding-in end of the machine to its frame. The bar has a lengthwise slot 172 extending transversely of the machine and on either side of the slot may be provided with ways 173 174 for the travel of a carriage 175. The carriage has suitable shafts 176 177, on which are mounted wheels 178 179, traveling on the ways 173 174. A screw-rod 181, provided with a collar 182, preferably depends through an aperture 183 in the carriage, the collar 182 being shouldered at 184 at the upper end of the aperture, the aperture being made flaring toward its lower end to allow for the swing of the screw-rod in its adjustments, as hereinafter described.

191 is a support, preferably yoke-shaped and carrying bearings 192 193 for a shaft 194, carrying a pulley 195. One of the arms of the yoke is preferably extended, as at 196, carrying at its outer end a swivel-nut 197, journaled therein, into which the screw-rod 181 is adapted to take. The support is hung on a transverse rod 198, suitably mounted in the frame of the machine, the bar taking through a slot 199 in the yoke and serving as the pivotal point for the yoke in its adjustments. The rear end of the support is preferably forked, as shown at 200, and has pivotally secured thereto by means of suitable bolts 201 a secondary yoke 2n2. The secondary yoke is provided with lugs 205 206. The matcher-hangers are also provided with suitable lugs, which we have shown at 207 208. Connecting the secondary yokes and the matcher-hangers, preferably attached to their lugs, respectively, are suitable tie-rods 209 210, having turnbuckles 211 212, whereby they may be shortened or lengthened. The rods may be secured to the yoke and matcher-hangers in any suitable manner, as by means of set-bolts or nuts. Suitable studs 221 222 are secured in position on the supports 191 and carry idler-pulleys 223 224 for the purpose hereinafter explained.

The belts for operating the matcher-spindles preferably pass over a main pulley or drum 225, mounted on a shaft G. The belt then passes to the pulley 228 on the matcher-spindle, clearing the pulley 195, and in its return passes over the pulley 195, mounted on the support 191. The idler-pulleys 223 224 guide the belt, the belt making what is known as a "quarter-twist" between the pulley on the operating-shaft and the pulley on the matcher-spindle. (See Figs. 8, 9, and 15.)

The screw-rod 181 is provided with a suitable seat 227 for the insertion of a proper crank for turning the same. When the outer end of the support is raised, the tie-rods are preferably elongated by the turning of the turnbuckles, as before described, and vice versa.

The flaring of the aperture 183 and the slot 199 provide accommodation for the varying adjustments and conditions in adjustment of the tightener. The tie-rods are of sufficient length that when the matcher-spindles are set to different positions transversely of the machine they may extend angling longitudinally of the machine to the tighteners to a limited extent without danger of damage. The carriage, however, being mounted on rollers, easily accommodates the support to the adjusted position of the hanger, and if strain is brought from the matcher-housings the carriage will travel on the cross-bar, and as soon as the machine is started up and the belts begin to move the belts will automatically find their proper position on the drum with relation to the matcher-hangers, the carriage following the lead given it by the belt and the pulley on the support being automatically carried to the proper position transversely of the machine for the proper operation of the belts to the matcher-spindles by the contact of the side edges of the belts against the vertical pulleys 223, mounted on either side of the pulley 195, between the vertical plane of the axis of the latter and the vertical-spindle pulley, thus leading the pulley 195 to proper transverse position.

The main spindle B is operated from a pulley 231 on the driving-shaft G and the lower cylinder B' through the medium of a pulley 232, mounted on a shaft 233, supported in bearings 234 235 on a slide 236. The slide is mounted on a support 237, which is pivoted to a stud 238, preferably mounted in a bracket 239, bolted to the frame of the machine. The slide 236 is preferably adjusted on ways 241 on the support 237. Suitable slots 242, preferably T-shaped, are carried by ways having headed bolts 243, adjustably slipped into the slot, taking through the plate and held in place by nuts 244. Suitable ribs may depend from the lower side of the plate and take against the side edges of the ways, or the plate may be dovetailed to the support in a suitable manner.

A screw-shaft 245 is collared into an ear 246 on the support and taps into a lug 247 on the slide. This latter adjustment is for the purpose of giving the proper tension to the belt taking about the pulley 232 and the pulley on the lower cylinder. The support 237 is also provided with a swivel-nut 251, preferably near its free end, into which a screw-shaft 252 is adapted to take, the screw-shaft being supported in a collar 253, hinged to the frame of the machine, as at 254, having a collar 255 to prevent its downward movement and a squared end 256 to receive a suitable wrench. By means of this screw-shaft and connected parts the support 237 is given a pivotal motion on the stud 238 to adjust the tension of the belt for the cylinder B, passing over the pulley on the main shaft to the pulley on the same. The belt for the upper cylinder impinges against the belt for the lower cylinder and carries it and its supporting-pulleys with it in its movements. The support and its connected parts therefore act as a combined belt-tightener for the belt for the lower cylinder and the belt for the upper cylinder. The outer end of the stud 238 may also be provided with an ordinary idler-belt tightener 260 for actuating the feed-gearing and tightening the belt from a pulley 261 on the driving-shaft and a pulley 262 on a suitable shaft communicating with the gearing for the feeding devices. A suitable train of gears is provided for operating the various feed-rolls.

We have shown and described our preferred form for accomplishing the result obtained in our improved device. It is obvious changes in construction shown and described may be made without departing from the spirit of our invention, and we do not wish to be limited to the precise methods shown.

We claim—

1. In a planing-machine, the combination of a main frame, a cutter-cylinder therefor, a work-support, a housing in which the cutter-cylinder is mounted adjustable on the frame, with bearings in the housing for the cylinder, a part on the housing for the cylinder for taking against the stock passing through the machine, means for adjusting the part with relation to the housing, vertical cutter-spindles, an oppositely-arranged cylinder, a pressure device, a standard therefor, means for adjusting the first-named cylinder-housing and means for adjusting the pressure device and firmly holding the same in adjusted position with relation to the frame, and a pivotally-hung pressure-bar between the vertical spindles extending from a connection with the housing for the first-named cylinder to a connection with the pressure-device standard for forming a bearing for the stock between the first-named cylinder and the pressure device and between the vertical cutter-spindles firm with relation to the frame, substantially as described.

2. In a planing-machine, the combination of a main frame, a cutter-cylinder therefor, a work-support, a housing in which the cutter-cylinder is mounted adjustable on the frame, with bearings in the housing for the cylinder, a part on the housing for the cylinder for taking against the stock passing through the machine, means for adjusting the part with relation to the housing, vertical cutter-spindles, an oppositely-arranged cylinder, a pressure-plate opposite the latter cylinder for holding the stock thereagainst, means for adjusting the first-named cylinder-housing and means for adjusting the pressure-plate and rigidly holding the same in adjusted position with relation to the frame, and a pivotally-hung pressure-bar between the vertical spindles extending from a connection with the housing for the first-named cylinder to a connection with the pressure-plate, with means for holding the pressure-bar in firm relation with the first-named cylinder-bearings and the pressure-plate, substantially as described.

3. In a planing-machine, the combination of a main frame, a cutter-cylinder therefor, a work-support, a housing in which the cutter-cylinder is mounted adjustable on the frame, with bearings in the housing for the cylinder, a part on the housing for the cylinder for taking against the stock passing through the machine, means for adjusting the part with relation to the housing, vertical cutter-spindles, an oppositely-arranged cylinder, a pressure-plate opposite the latter cylinder for holding the stock thereagainst, means for adjusting the first-named cylinder-housing and means for adjusting the pressure-plate, and a pivotally-hung pressure-bar between the vertical spindles extending from a connection with the housing for the first-named cylinder to a connection with the pressure-plate, and a longitudinally-sliding connection for the pressure-bar, with means for holding the pressure-bar in firm relation with the first-named cylinder-bearings and the pressure-plate, substantially as described.

4. In a planing-machine, the combination of a main frame, a cutter-cylinder therefor, a work-support, a housing in which the cutter-cylinder is mounted adjustable on the frame, with bearings in the housing for the cylinder, a part on the housing for taking against the stock passing through the machine, means for adjusting the part with relation to the housing, vertical cutter-spindles, an oppositely-arranged cylinder, a pressure-plate opposite the latter cylinder for holding the stock thereagainst, means for adjusting the first-named cylinder-housing and means for adjusting the pressure-plate, and a pivotally-hung pressure-bar between the vertical spindles extending from a connection with the housing for the first-named cylinder to a connection with the pressure-plate, and a positive lateral adjustment or adjustments for the bar, and constructed and arranged for holding the pressure-bar in rigid relation with the first-named cylinder-bearings and the pressure-plate after adjustment, substantially as described.

5. In a planing-machine, the combination of a main frame, a cutter-cylinder therefor, a work-support, a housing in which the cutter-cylinder is mounted adjustable on the frame, with bearings in the housing for the cylinder, a part on the housing for taking against the stock passing through the machine, means for adjusting the part with relation to the housing, vertical cutter-spindles, an oppositely-arranged cylinder, a pressure-plate opposite the latter cylinder for holding the stock thereagainst, means for adjusting the first-named cylinder-housing and means for adjusting the pressure-plate, and a pivotally-hung pressure-bar between the vertical spindles extending from a connection with the housing for the first-named cylinder to a connection with the pressure-plate, and a positive vertical adjustment or adjustments for the bar, and constructed and arranged for holding the pressure-bar in rigid relation with the first-named cylinder-bearings and the pressure-plate after adjustment, substantially as described.

6. In a planing-machine, the combination of a main frame, a cutter-cylinder therefor, a work-support, a housing in which the cutter-cylinder is mounted adjustable on the frame, with bearings in the housing for the cylinder, a part on the housing for taking against the stock passing through the machine, means for adjusting the part with relation to the housing, vertical cutter-spindles, an oppositely-arranged cylinder, a pressure-plate opposite the latter cylinder for holding the stock thereagainst, means for adjusting the first-named cylinder-housing and means for adjusting the pressure-plate, and a pivotally-hung pressure-bar between the vertical spindles extending from a connection with the housing for the first-named cylinder to a connection with the pressure-plate, and a positive vertical adjustment or adjustments for the bar, and a positive lateral adjustment or adjustments for the bar, and constructed and arranged for holding the pressure-bar in rigid relation with the first-named cylinder-bearings and the pressure-plate after adjustment, substantially as described.

7. In a planing-machine, the combination of a main frame, a cutter-cylinder therefor, a work-support, a housing in which the cutter-cylinder is mounted adjustable on the frame, with bearings in the housing for the cylinder, a part on the housing for taking against the stock passing through the machine, means for adjusting the part with relation to the housing, vertical cutter-spindles, an oppositely-arranged cylinder, a pressure-plate opposite the latter cylinder for holding the stock thereagainst, means for adjusting the first-named cylinder-housing and means for adjusting the pressure-plate, a pivotally-hung pressure-bar between the vertical spindles extending from a connection with the housing for the first-named cylinder to a connection with the pressure-plate, a longitudinally-sliding connection for the bar, and a positive adjustment or adjustments for each end of the bar, and constructed and arranged for holding the pressure-bar in rigid relation with the first-named cylinder-bearings and the pressure-plate after adjustment, substantially as described.

8. In a planing-machine, the combination of a main frame, a cutter-cylinder therefor, a work-support, a presser-foot in rear of the cylinder, vertical cutter-spindles, a lower cylinder, a pressure-plate above the cylinder, means for adjusting the presser-foot and pressure-plate and rigidly holding the same in adjusted position with relation to the frame, and a hinged pressure-bar connecting the presser-foot and the pressure-plate between the vertical spindles, with means for holding the hinged pressure-bar in rigid relation with the presser-foot and the pressure-plate, substantially as described.

9. In a planing-machine, the combination of a main frame, a cutter-cylinder therefor, a work-support, a presser-foot in rear of the cylinder, vertical cutter-spindles, a lower cylinder, a pressure-plate above the cylinder, means for adjusting the presser-foot and pressure-plate and rigidly holding the same in adjusted position with relation to the frame, and a hinged pressure-bar between the vertical spindles connecting the presser-foot and the pressure-plate, and a lateral adjustment or adjustments for the bar, with means for holding the hinged pressure-bar in rigid relation with the presser-foot and the pressure-plate after adjustment, substantially as described.

10. In a planing-machine, the combination of a main frame, a cutter-cylinder therefor, a work-support, a presser-foot in rear of the cylinder, vertical cutter-spindles, a lower cylinder, a pressure-plate above the cylinder, means for adjusting the presser-foot and pressure-plate and rigidly holding the same in adjusted position with relation to the frame, a hinged pressure-bar connecting the presser-foot and the pressure-plate between the vertical spindles, and means for positively adjusting the pressure-bar vertically, with means for holding the hinged pressure-bar in rigid relation with the presser-foot and the pressure-plate after adjustment, substantially as described.

11. In a planing-machine, the combination of a main frame, a cutter-cylinder therefor, a work-support, a presser-foot in rear of the cylinder, vertical cutter-spindles, a lower cylinder, a pressure-plate above the cylinder, means for adjusting the presser-foot and pressure-plate and rigidly holding the same in adjusted position with relation to the frame, and a hinged pressure-bar connecting the presser-foot and the pressure-plate between the vertical spindles, means for positively adjusting the pressure-bar vertically, and means for positively adjusting the pressure-bar laterally, with means for holding the hinged pressure-bar in rigid relation with the presser-foot and the pressure-plate after adjustment, substantially as described.

12. In a planing-machine, the combination of a main frame, a horizontal cutter-cylinder, one or more vertical cutter-spindles, a hanger for each of the latter, a transverse guiding-bar for the same, a rock-shaft parallel thereto, a spiral gear splined to the rock-shaft, a screw-shaft on the hanger, a spiral gear on the screw-shaft meshing with the gear on the rock-shaft, constructed and arranged for clamping the hanger to the guiding-bar, substantially as described.

13. In a planing-machine, the combination of a main frame, a horizontal cutter-cylinder, one or more vertical cutter-spindles, a hanger for each of the latter, a transverse guiding-bar for the same, a rock-shaft parallel thereto, a spiral gear splined to the rock-shaft, a screw-shaft secured to the hanger, a slot in the guiding-bar for the screw-shaft, a saddle taking about the screw-shaft, ways in the guiding-bar for the saddle, the second spiral gear internally threaded meshing with the screw-shaft and the first gear, an annular groove in the first gear, and a fork on the saddle taking into the groove and guiding the gear sidewise with the movement of the hanger, substantially as described.

14. In a planing-machine, the combination of a main frame, a horizontal cutter-cylinder, one or more vertical cutter-spindles, a hanger for each of the latter, a transverse guiding-bar for the same, a rock-shaft parallel thereto, a spiral gear splined to the rock-shaft, a screw-shaft secured to the hanger, a slot in the guiding-bar for the screw-shaft, a saddle taking about the screw-shaft, ways in the guiding-bar for the saddle, the second spiral gear internally threaded meshing with the screw-shaft and the first gear, an annular groove in the first gear, and a fork on the saddle taking into the groove and guiding the gear sidewise with the movement of the hanger, and a ring extending from the saddle and taking about the shaft for steadying the same, substantially as described.

15. In a planing-machine, the combination of a main frame, a horizontal cutter-cylinder therefor, one or more vertical cutter-spindles, a hanger for each spindle, means for adjusting each hanger laterally, a pulley on each of the vertical spindles for driving the same, a main pulley, a support between the vertical plane of the main pulley and each vertical cutter-spindle, a third pulley mounted thereon and located between the vertical plane of the main pulley and the vertical-spindle pulley, a transverse bar, a carriage for the bar, a screw-shaft connecting the carriage and the support, constructed and arranged for passing a belt over the vertical-spindle pulley, the third pulley on the support, and the main pulley, and for tightening the belt by the adjustment of the screw-shaft connecting the carriage and the support, and one or more connecting-rods between the hanger and the support for guiding the transverse travel of the carriage by the position of the hanger, substantially as described.

16. In a planing-machine, the combination of a main frame, a horizontal cutter-cylinder therefor, one or more vertical cutter-spindles, a hanger for each spindle, means for adjusting each hanger laterally, a pulley on each of the vertical spindles for driving the same, a main pulley, a support between the vertical plane of the main pulley and each vertical cutter-spindle and arranged to slide transversely of the machine, a third pulley mounted horizontally thereon and located between the vertical plane of the main pulley and the vertical-spindle pulley, a guiding-pulley rotatably mounted vertically on the support adjacent to the horizontal pulley to each side thereof between the vertical plane of the axis of the third pulley and the vertical spindle and rotating with its axis at substantially right angles to the axis of rotation of the third pulley and constructed for making contact with either edge of the belt passing with its flat face over the third pulley and thereby guiding the same thereon and transversely sliding the third pulley with its support, and guiding the transverse movement of the support by the position of the hanger, substantially as described.

17. In a planing-machine, the combination of a main frame, a horizontal cutter-cylinder therefor, one or more vertical cutter-spindles, a hanger for each spindle, means for adjusting each hanger laterally, a pulley on each of the vertical spindles for driving the same, a main pulley, a support between the vertical plane of the main pulley and each vertical cutter-spindle and arranged to slide transversely of the machine, a third pulley mounted horizontally thereon and located between the vertical plane of the main pulley and the vertical-spindle pulley, a connection between the support for the third pulley and the vertical-spindle hanger, a guiding-pulley rotatably mounted vertically on the support adjacent to the horizontal pulley to each side thereof between the vertical plane of the axis of the third pulley and the vertical spindle and rotating with its axis at substantially right angles to the axis of rotation of the third pulley, and constructed for making contact with either edge of the belt passing with its flat face over the third pulley and thereby guiding the same thereon and transversely sliding the third pulley with its support, and constructed and arranged for guiding the transverse movement of the support by the position of the hanger, substantially as described.

18. In a planing-machine, the combination of a main frame, a horizontal cutter-cylinder therefor, one or more vertical cutter-spindles, a hanger for each spindle, means for adjusting each hanger laterally, a pulley on each of the vertical spindles for driving the same, a main pulley, a support between the vertical plane of the main pulley and each vertical cutter-spindle, a third pulley mounted thereon and located between the vertical plane of the main pulley and the vertical-spindle pulley, a transverse bar, a carriage for the bar, a screw-shaft connecting the carriage and the support, a secondary yoke constructed and arranged for passing a belt over the vertical-spindle pulley, the third pulley on the support, and the main pulley, and for tightening the belt by the adjustment of the screw-shaft connecting the carriage and the support, and one or more connecting-rods between the hanger and the secondary yoke for guiding the transverse travel of the carriage by the position of the hanger, substantially as described.

19. In a planing-machine, the combination of a main frame, a horizontal cutter-cylinder therefor, one or more vertical cutter-spindles, a hanger for each spindle, means for adjusting each hanger laterally, a pulley on each of the vertical spindles for driving the same, a main pulley, a support between the vertical plane of the main pulley and each vertical cutter-spindle, a transverse rod, an elongated opening in the support for the rod, a third pulley mounted on the support and located between the vertical plane of the main pulley and the vertical-spindle pulley, a transverse bar, a carriage for the bar, a screw-shaft connecting the carriage and the support, constructed and arranged for passing a belt over the vertical-spindle pulley, the third pulley on the support, and the main pulley, and for tightening the belt by the adjustment of the screw-shaft connecting the carriage and the support, and an extensible rod or rods connecting the hanger and the support for guiding the transverse travel of the carriage by the position of the hanger, substantially as described.

20. In a planing-machine, the combination of a main frame, a horizontal cutter-cylinder therefor, one or more vertical cutter-spindles, a hanger for each spindle, means for adjusting each hanger laterally, a pulley on each of the vertical spindles for driving the same, a main pulley, a support between the vertical plane of the main pulley and each vertical cutter-spindle, a third pulley mounted thereon and located between the vertical plane of the main pulley and the vertical-spindle pulley, a transverse bar, a carriage for the bar, a flaring opening therein and a pivotally-mounted nut for the support, a screw-shaft connecting the carriage and the nut, constructed and arranged for passing a belt over the vertical-spindle pulley, the third pulley on the support, and the main pulley, and for tightening the belt by the adjustment of the screw-shaft connecting the carriage and the support, and one or more connecting-rods between the hanger and the support for guiding the transverse travel of the carriage by the position of the hanger, substantially as described.

21. In a planing-machine, the combination of a main frame, a horizontal cutter-cylinder therefor, one or more vertical spindles, a hanger for each spindle, means for adjusting each hanger laterally, a pulley on each of the vertical spindles for driving the same, a main pulley, a support between the vertical plane of the main pulley and each vertical cutter-spindle, a third pulley mounted thereon between the vertical plane of the main pulley and the vertical-spindle pulley, a transverse bar, a carriage on the bar, a screw-shaft connecting the carriage and the support, constructed and arranged for passing the belt over the vertical-spindle pulley, the third pulley on the support, and the main pulley, and for the tightening of the belt by the adjustment of the screw-shaft connecting the carriage and the support, with one or more connecting-rods between the support and the hanger, with a guiding-pulley rotatably mounted vertically on the support adjacent to the horizontal pulley to each side thereof between the vertical plane of the axis of the third pulley and the vertical spindle, and constructed and arranged for making contact with either edge of a belt passing with its flat face over the third pulley and for guiding the transverse travel of the carriage by the position of the hanger, substantially as described.

22. In a planing-machine, the combination of a main frame, an upper cutter-cylinder, a lower cutter-cylinder, a pulley on each, a shaft, a pulley thereon for the upper cylinder, a swinging support on the frame, a slide thereon, a pulley for the lower cutting-cylinder mounted on the slide, means for adjusting the slide to and from the pulley on the lower cylinder, and an adjusting device for adjusting the support transversely of the axis of the pulley on the slide, substantially as described.

JOHN RICKARD THOMAS.
HARRY SMITH SPENCER.

Witnesses:
PARKE S. JOHNSON,
EMIL RAPP.